(12) United States Patent
Abington et al.

(10) Patent No.: US 10,428,938 B2
(45) Date of Patent: Oct. 1, 2019

(54) METHOD AND SYSTEM FOR CONTROLLING A VEHICLE PROPULSION SYSTEM

(71) Applicant: GM GLOBAL TECHNOLOGY OPERATIONS LLC, Detroit, MI (US)

(72) Inventors: James Abington, Brighton, MI (US); Jacob V. Renquist, Royal Oak, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 273 days.

(21) Appl. No.: 15/656,529

(22) Filed: Jul. 21, 2017

(65) Prior Publication Data

US 2019/0024784 A1    Jan. 24, 2019

(51) Int. Cl.
*F16H 61/14* (2006.01)
*F16D 48/06* (2006.01)
*F16H 63/46* (2006.01)
*F16H 59/62* (2006.01)
*F16H 61/662* (2006.01)
*F16H 59/70* (2006.01)

(52) U.S. Cl.
CPC .......... *F16H 61/143* (2013.01); *F16D 48/06* (2013.01); *F16H 59/62* (2013.01); *F16H 61/66259* (2013.01); *F16H 63/46* (2013.01); *F16D 2500/10412* (2013.01); *F16D 2500/308* (2013.01); *F16D 2500/3065* (2013.01); *F16D 2500/3067* (2013.01); *F16D 2500/3121* (2013.01); *F16D 2500/3144* (2013.01); *F16H 2059/702* (2013.01); *F16H 2059/704* (2013.01)

(58) Field of Classification Search
CPC ........ F16D 48/06; F16H 59/62; F16H 61/143; F16H 2061/147
See application file for complete search history.

(56) References Cited

U.S. PATENT DOCUMENTS

| | | | | |
|---|---|---|---|---|
| 2002/0193202 | A1* | 12/2002 | Toyoda | F16H 61/143 477/62 |
| 2014/0018207 | A1* | 1/2014 | Kobayashi | B60K 6/48 477/5 |
| 2017/0158198 | A1* | 6/2017 | Takahashi | B60W 10/026 |

* cited by examiner

*Primary Examiner* — Edwin A Young (57) ABSTRACT

A vehicle propulsion system that includes a prime mover having an output shaft, a torque converter including a compressor coupled to the output shaft of the prime mover, a turbine fluidly coupled to the compressor, and a torque converter clutch for selectively mechanically coupling the compressor to the turbine, a continuously variable transmission (CVT) coupled to the turbine of the torque converter, and a controller that is programmed to receive signals indicating operating conditions of the vehicle propulsion system, determine whether the received signals indicate a reduction in ratio in the CVT is impending, determine whether to open the torque converter clutch based upon a determination that a reduction in ratio is impending, and open the torque converter clutch in response to a determination to open the torque converter clutch.

2 Claims, 6 Drawing Sheets

METHOD AND SYSTEM FOR CONTROLLING A VEHICLE PROPULSION SYSTEM

FIELD

The present disclosure relates to a method and system for controlling a vehicle propulsion system.

INTRODUCTION

This introduction generally presents the context of the disclosure. Work of the presently named inventors, to the extent it is described in this introduction, as well as aspects of the description that may not otherwise qualify as prior art at the time of filing, are neither expressly nor impliedly admitted as prior art against this disclosure.

A continuously variable transmission (CVT) is a type of vehicle transmission that is capable of continuously changing an output/input speed ratio over a range between a minimum (underdrive) ratio and a maximum (overdrive) ratio, thus permitting an infinitely variable selection of engine operation that can achieve a preferred balance of fuel consumption and engine performance in response to an output torque request. Unlike conventionally-geared transmissions that use one or more planetary gear sets and multiple rotating and braking friction clutches to establish a discrete gear state, a CVT uses a variable-diameter pulley system to achieve an infinitely variable selection of gear ratios.

The pulley system, which is commonly referred to as a variator assembly, can transition anywhere within a calibrated range of speed ratios. A typical belt-type or chain-type variator assembly includes two variator pulleys interconnected via an endless rotatable drive element, such as a drive chain or belt. The endless rotatable drive element rides within a variable-width gap defined by conical pulley faces. One of the variator pulleys receives engine torque via a crankshaft, torque converter, and an input gear set, and thus acts as a driving/primary pulley. The other pulley is connected via additional gear sets to an output shaft of the CVT and thus acts as a driven/secondary pulley.

In order to vary a CVT speed ratio and to transfer torque to the drivetrain, a clamping force (applied through hydraulic pressure) may be applied to one or both of the variator pulleys via one or more pulley actuators. The clamping force effectively squeezes the pulley halves together to change the width of the gap between pulley faces. Variation of the gap size, i.e., the pitch radius, causes the rotatable drive element to ride higher or lower within the gap. This, in turn, changes the effective diameters of the variator pulleys and may vary the speed ratio of the CVT.

One control strategy for a vehicle propulsion system, which includes a CVT, is to configure the system to provide the best fuel economy. In a coasting situation, this may result in the engine operating at a low speed. Further, a hydraulic pump, which provides the hydraulic pressure that is used to control the CVT speed ratio, may be placed in a low flow and low pressure configuration to reduce the amount of energy required to operate the pump which may then further enhance fuel economy. In general, it is also desirable to reduce the overall size and/or flow capacity of these pumps to minimize the amount of energy required to operate the pump and to further improve fuel economy. However, this may result in challenges when additional power is requested by the driver. A driver may indicate a request for power by manipulating an accelerator pedal and the position of that pedal may then be used by the control system to configure the vehicle propulsion system to provide the requested power.

In response to a request for additional torque from the driver, especially when starting from a coast configuration, the control system may request additional torque by requesting that the engine operate at a higher speed and also commanding a reconfiguration of the CVT to a lower ratio. However, the ability for the CVT to quickly reduce the ratio (as in a power downshift) may be reduced because the engine that provides the power to operate the CVT hydraulic control pump and to propel the vehicle may have started from a low engine speed and the power that is required to increase the flow to the CVT hydraulic control pump may not be immediately available. It takes time for the engine speed to increase sufficiently to provide enough power to enable a ratio decrease. However, a ratio decrease may be necessary to provide the higher engine speed. This combination of factors may result in a delayed response to a driver request for increased torque.

Further, this problem may be further exasperated when the vehicle propulsion system is operated at higher altitudes. At higher altitudes, the power that is available from an engine may be reduced. This reduction in available power from the engine and, thus a reduced ability to quickly provide a ratio decrease, may further increase a delay in response to a driver request for increased torque.

SUMMARY

In an exemplary aspect, a vehicle propulsion system includes a prime mover having an output shaft, a torque converter including a compressor coupled to the output shaft of the prime mover, a turbine fluidly coupled to the compressor, and a torque converter clutch for selectively mechanically coupling the compressor to the turbine, a continuously variable transmission (CVT) coupled to the turbine of the torque converter, and a controller that is programmed to receive signals indicating operating conditions of the vehicle propulsion system, determine whether the received signals indicate a reduction in ratio in the CVT is impending, determine whether to open the torque converter clutch based upon a determination that a reduction in ratio is impending, and open the torque converter clutch in response to a determination to open the torque converter clutch.

In another exemplary aspect, the received signals include an accelerator pedal position signal, and the controller determines a reduction in ratio is impending based upon the accelerator pedal position signal.

In another exemplary aspect, the controller further determines whether accelerator pedal position signal is a step change that exceeds a predetermined threshold.

In another exemplary aspect, the received signals include a prime mover capacity signal that indicates the capacity of the prime mover to provide torque and wherein the determining whether to open the torque converter clutch is further based upon the prime mover capacity signal.

In another exemplary aspect, the controller is further programmed to determine whether the capacity of the prime mover to provide torque is below a predetermined threshold and the determination whether to open the torque converter clutch is further based upon whether the capacity of the prime mover to provide torque is below the predetermined threshold.

In another exemplary aspect, the prime mover includes an engine, the received signals include an engine speed signal indicating a speed of the engine, and the controller determines whether the capacity of the prime mover is below a predetermined threshold based upon a determination whether the engine speed is below a predetermined engine speed.

In another exemplary aspect, the received signals include a signal indicative of an altitude of the vehicle propulsion system and the controller determines whether the capacity of the prime mover is below a predetermined threshold based upon a determination whether the altitude is above a predetermined altitude.

In another exemplary aspect, the received signals indicate the rate at which the CVT is capable of changing ratio, and the determination whether to open the torque converter clutch is based upon whether a difference between the rate at which the CVT is capable of changing ratio and a desired rate exceeds a predetermined threshold.

In another exemplary aspect, the CVT include a hydraulic pump operable in a plurality of modes and the mode in which the hydraulic pump operates indicates the rate at which the CVT is capable of changing ratio.

In another exemplary aspect, the controller is further programmed to: calculate an estimated time to end of shift based upon the received signals, determine when to apply the torque converter clutch based upon the estimated time to end of shift, and apply the torque converter clutch in response to a determination to apply the torque converter clutch.

In this manner, the quickness with which a vehicle propulsion system which includes a continuously variable transmission, may implement a downshift is greatly increased, the acceleration of a vehicle incorporating the vehicle propulsion system is increased during a downshift, the ability to incorporate highly fuel efficient engine operating modes and CVT hydraulic pump operation, structure and size is improved without adversely affecting a downshift event, the responsiveness of the vehicle propulsion system to accelerate in response to a driver input is improved. This additionally improves the driver experience because the vehicle propulsion system may noticeably react more quickly to the driver input and may also result in smoother, improved shifting.

The above features and advantages, and other features and advantages, of the present invention are readily apparent from the detailed description, including the claims, and exemplary embodiments when taken in connection with the accompanying drawings.

BRIEF DESCRIPTION OF THE DRAWINGS

The present disclosure will become more fully understood from the detailed description and the accompanying drawings, wherein.

DETAILED DESCRIPTION

Reference will now be made in detail to several examples of the disclosure that are illustrated in accompanying drawings. Whenever possible, the same or similar reference numerals are used in the drawings and the description to refer to the same or like parts or steps. The drawings are in simplified form and are not to precise scale. For purposes of convenience and clarity only, directional terms such as top, bottom, left, right, up, over, above, below, beneath, rear, and front, may be used with respect to the drawings. These and similar to directional terms are not to be construed to limit the scope of the disclosure in any manner.

Figure 1:
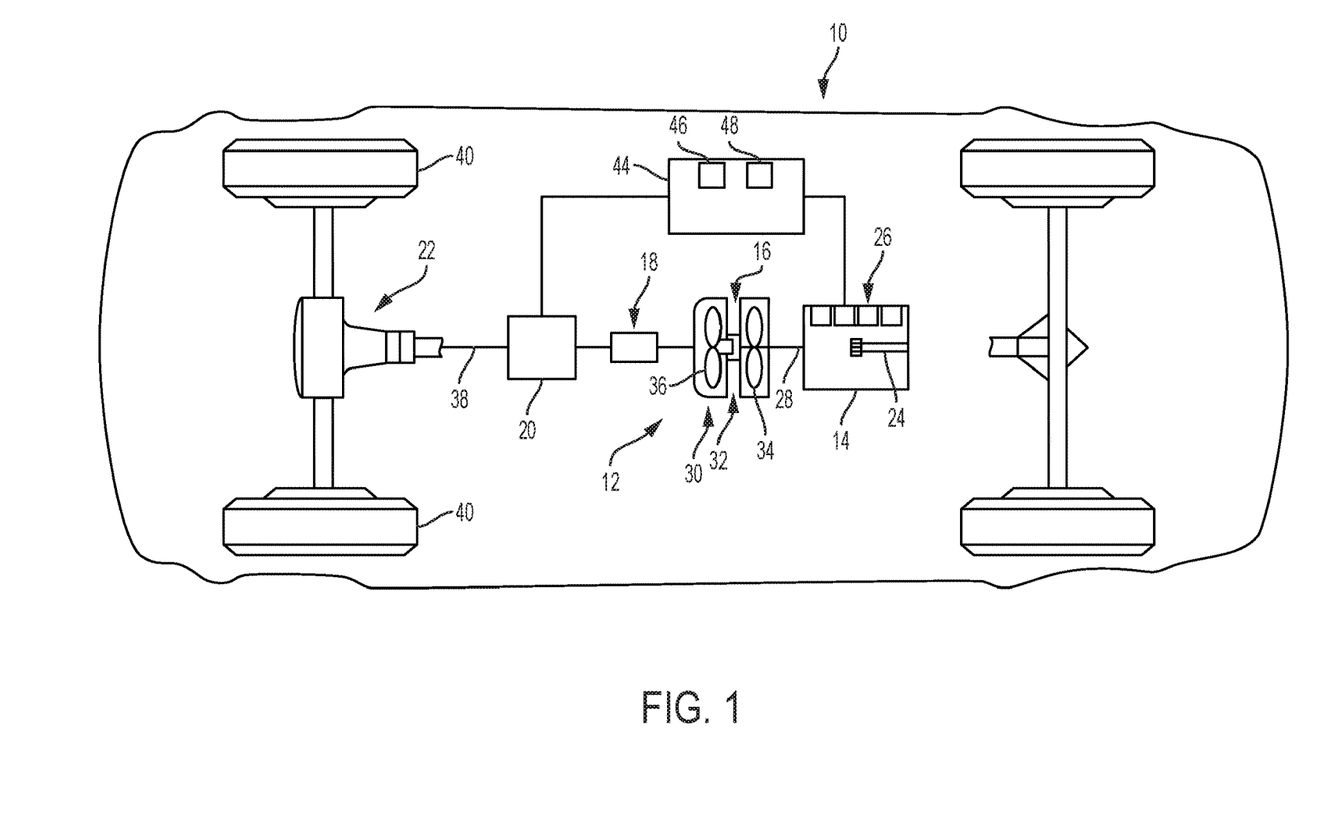
FIG. 1 is a schematic view of a vehicle including a vehicle propulsion system in accordance with the present disclosure.

Referring now to the drawings, wherein like reference numbers correspond to like or similar components throughout the several figures, FIG. 1 schematically illustrates a motor vehicle generally designated at 10. The motor vehicle 10 may be any type of vehicle, such as a car, truck, van, sport-utility vehicle, etc.

The motor vehicle 10 includes a propulsion system 12 configured to propel the motor vehicle 10. The propulsion system 12 may include a prime mover 14, a torque converter coupling 16, a forward drive clutch or switching mechanism 18, a continuously variable transmission (CVT) 20, and a final drive assembly 22. The prime mover 14 could be an internal combustion engine, an electric engine, or a hybrid, by way of example. The prime mover 14 may be an engine that is operable to power the motor vehicle 10 and includes a crankshaft 24 configured to rotate to move a plurality of pistons (not shown) within a plurality of piston cylinders 26. The crankshaft 24 is configured to move each of the pistons within its own respective cylinder 26.

Although the prime mover 14 is depicted as including four cylinders 26, the prime mover 14 may include any desired number of cylinders 26, such as two, three, four, six, or eight, by way of example. Each cylinder 26 is configured to undergo a combustion event to power the motor vehicle 10. The prime mover 14 has an output shaft 28 configured to transfer torque to the torque converter coupling 16.

The torque converter coupling 16 is connected to the output shaft 28 and includes a torque converter 30 and a torque converter lockup clutch 32. The torque converter 30 has an impeller (or pump) 34 and a turbine 36, which are typically separated by a stator (not shown). The impeller 34 is fixed to the engine output shaft 28. The impeller 34 is configured to form a fluid coupling with the turbine 36 under certain conditions, as is known in the art. The torque converter lockup clutch 32 is configured to selectively increase the torque-transmitting capacity between the impeller 34 and the turbine 36 to transmit torque and rotation between the impeller 34 and the turbine 36.

The turbine 36 is connected to the forward drive coupling/switching device 18, which may include a friction clutch, a binary clutch, or a Sprague type device, by way of example. The forward drive coupling/switching device 18 couples the prime mover 14 and CVT 20 in a forward direction. The CVT 20 is configured to selectively change a gear ratio between the output shaft 28 and a transmission output shaft 38. The forward drive coupling/switching device 18 is configured to selectively connect the turbine 36 to the CVT 20. The CVT 20 is interconnected with the final drive unit 22 to propel a set of wheels 40 of the motor vehicle 10. Although referred to generally as a CVT 20, the CVT 20 may be a continuously variable transmission, or an infinitely variable transmission, by way of example.

A control system 44 may be used to control the engine 14 and/or the CVT 20. In some variations, the control system 44 includes an engine control module 46 and a transmission control module 48, by way of example. The engine 14 and the CVT 20 may be equipped with a plurality of actuators and sensing devices for monitoring operation, and in the case of the engine 14, for delivering fuel to form a combustion charge to produce torque that is responsive to an operator torque request. The sensors associated with the engine 14 or CVT 20 may be configured to provide feedback to the control system 44.

Figure 2:
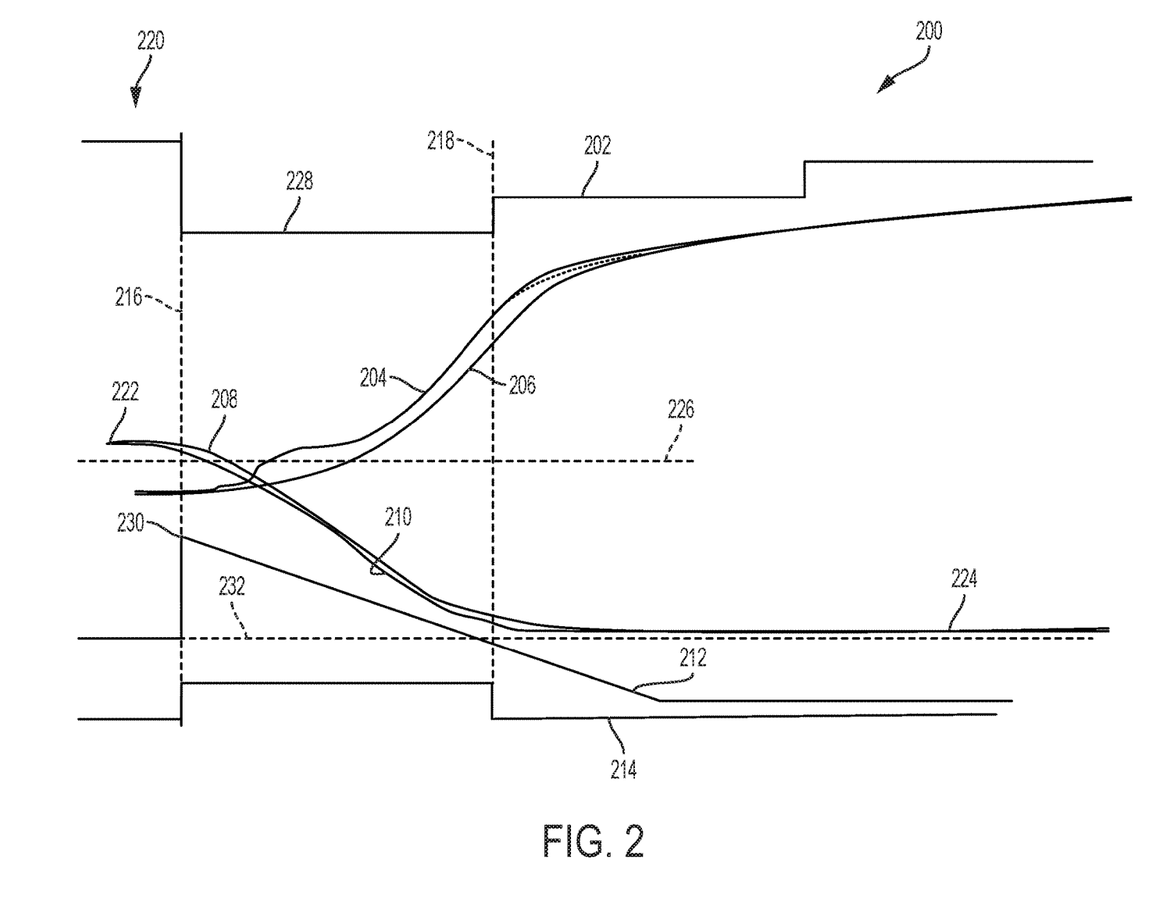
FIG. 2 is a graph that illustrates exemplary signals of a vehicle propulsion system control system in accordance with the present disclosure.

FIG. 2 is a graph 200 that illustrates exemplary signals of a vehicle propulsion system control system in accordance with the present disclosure. The graph 200 illustrates the torque converter clutch mode 202, the engine speed 204, the torque converter turbine speed 206, the actual CVT ratio 208, the desired CVT ratio 210, an estimated time to end of shift 212, and a shift state machine 214. A first vertical dashed line 216 indicates a start of a downshift and a second vertical dashed line 218 indicates an end to the downshift, both of which are also correspondingly indicated by the shift state machine 214. Prior to the start of the downshift at 216, the torque converter clutch is in a coast lock mode at 220.

In response to a request for a transition from the current ratio at 222 to a lower target ratio 224, a determination that the current ratio 222 differs from the lower target ratio more than a specified amount (which may be known as a "step shift") and a determination that the engine speed is below a predetermined engine speed 226, an exemplary embodiment may unlock and open the torque converter clutch to transition to a "TCC Off" mode 228. Additionally, an exemplary embodiment may determine an estimated time to end of shift 230.

Releasing, opening or unlocking the torque converter clutch decouples engine from the turbine of the torque converter which enables the engine speed 204 to more quickly increase to an engine speed that provides a higher torque. The turbine speed 206 is able to follow the engine speed as a result of the fluid coupling in the torque converter. Additionally, the fluid coupling of the torque converter enables torque multiplication which improves the torque output. With the ability of the engine to more quickly increase speed and provide a higher torque output sooner, the power available to the CVT hydraulic pump increases more rapidly which, in turn, enables a quicker transition from the initial ratio toward the target ratio than would otherwise have been possible. In other words, opening the torque converter clutch in this manner enables a faster increase in engine speed which results in an quicker increase in engine torque output, torque multiplication across the torque converter, and also provides more power, more quickly to the CVT hydraulic control system to enable improved ratio change response.

As the CVT ratio 208 moves closer to the target ratio and the resultant estimated time to end of shift crosses a "zero time line" 232, the torque converter clutch may then transition to an on mode which may correspond to, for example, a slip control mode at the end of shift 218. As the torque converter clutch is controllably applied, the turbine speed controllably approaches the engine speed until they substantially match and the torque converter may then be transitioned to a lock mode. In an exemplary embodiment, the estimated time to end of shift and resultant determination of when to move to a torque converter clutch on or slip mode may be coordinated with and/or be responsive to the ratio control of the CVT. The moment at which the torque converter clutch actually transitions between the off mode and an apply mode may be adjusted and/or calibrated based upon a variety of known factors. Preferably, the torque converter clutch may be commanded to an apply mode just prior to the actual end of shift to compensate for inherent delays in the hydraulic and/or mechanical system.

Figure 3:
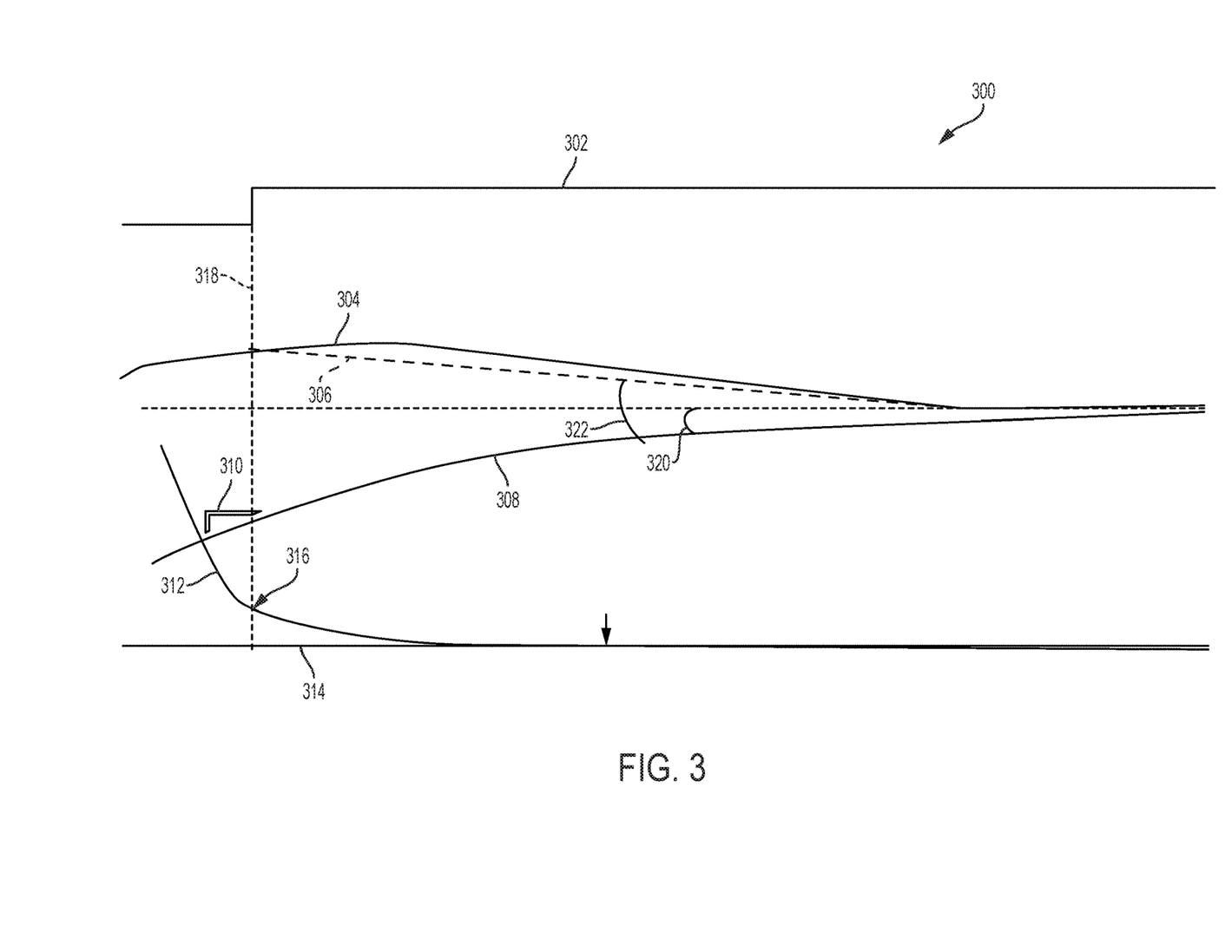
FIG. 3 is another graph that illustrates exemplary signals of a vehicle propulsion system control system in accordance with the present disclosure.

FIG. 3 is a graph 300 that illustrates exemplary signals during a transition between a torque converter clutch off mode and a torque converter clutch apply mode for a vehicle propulsion system control system in accordance with the present disclosure. The graph 300 includes a torque converter clutch mode 302, an engine speed 304, a desired engine speed 306, a projected turbine speed 308, an instantaneous turbine acceleration 310, the CVT ratio 312, and the target CVT ratio 314. In this manner, once the torque converter clutch enters into the apply mode, control over the torque converter clutch slip rate may rely upon the actual turbine acceleration rate 310 and the actual or current ratio 316 at an instant of time 318 and knowing the targeted ratio the final turbine acceleration rate at the end of the shift 320 may be predicted and the system may be calibrated and controlled to provide a desired engine acceleration (or desired engine approach rate 322). In this manner, the rate at which the engine is accelerated may be accurately and reliably controlled.

A similar manner of controllably transitioning from a torque converter apply mode and a locked mode is described in co-pending, co-assigned U.S. patent application Ser. No. 15/469,796, which is hereby incorporated herein in its entirety. Differences between the manner of controlling the CVT during the transition described by the prior reference is that the prior reference described a transition during an increase in ratio, as opposed to a ratio decrease, and the control being based upon predicted conditions rather than actual measured conditions.

Figure 4:
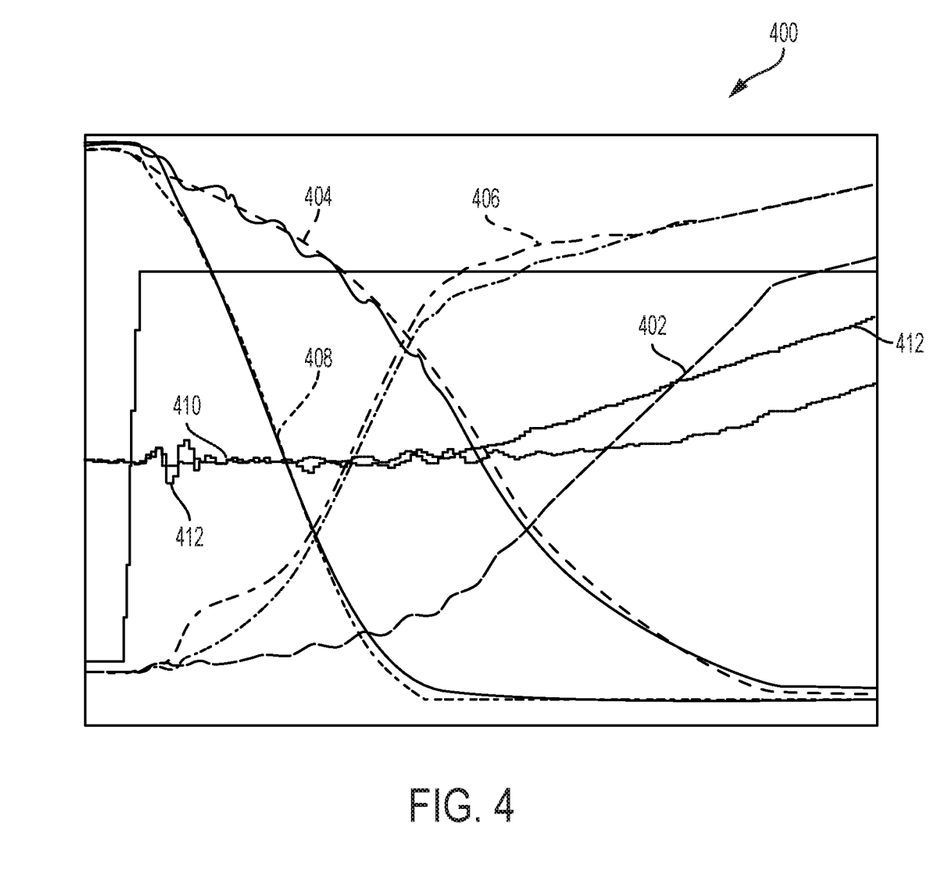
FIG. 4 is a graph 400 of vehicle propulsion system signals illustrating the improved response that is provided by an exemplary embodiment of the present disclosure.

FIG. 4 is a graph 400 of vehicle propulsion system signals illustrating the improved response that is provided by an exemplary embodiment of the present disclosure. The graph 400 illustrates engine speed 402 and the CVT ratio 404 when the torque converter clutch remains locked throughout a ratio decrease transition and engine speed 406 and CVT ratio 408 when the torque converter is unlocked. The signals illustrated in FIG. 4 correspond with data acquired by an actual vehicle at an altitude of approximately seven thousand feet above sea level. In this instance, under the same, somewhat extreme, altitude conditions, the shift time is reduced by about one and one-half seconds.

In an exemplary embodiment, with the significant effect altitude has on the power available from the engine, the control system may be calibrated and/or adjusted to compensate to open the torque converter clutch more often. For example, the control system may responsive not only to accelerator pedal input and engine speed, but also to the capacity of the engine to provide power (as may be affect by altitude) to determine when and whether to open the torque converter clutch during a downshift CVT ratio change. In one exemplary embodiment, an ambient air pressure sensor may provide a signal that is indicative of altitude. In some vehicle propulsion system, an engine controller may also calculate a variable which corresponds to a "percent capability" of the engine under current conditions. This "percent capability" variable may also be a reliable indicator to determine whether and when to unlock the torque converter clutch during a downshift.

The graph 400 of FIG. 4 illustrates that not only does the engine speed increase quicker, and the ratio change happens more quickly, but the vehicle accelerates more quickly as a result. The graph 400 illustrates the vehicle speed 410 when the torque converter clutch remains locked throughout the ratio change and the vehicle speed 412 when the torque converter clutch is opened in accordance with an exemplary embodiment of the present disclosure. The speed 412 of the vehicle is clearly higher than the vehicle speed 410.

Figure 5:
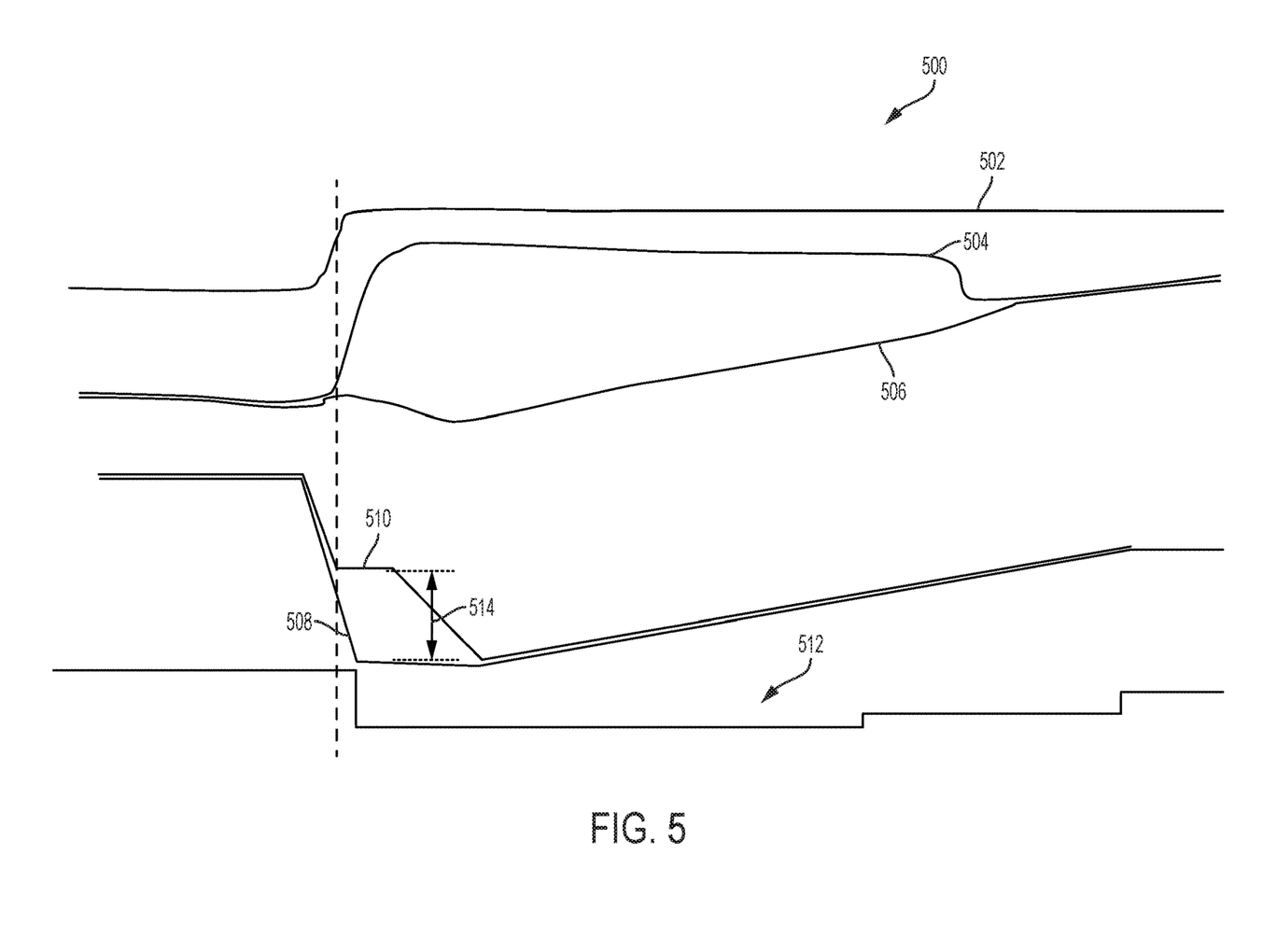
FIG. 5 is a graph that illustrates signals of a vehicle propulsion system control system in accordance with another exemplary embodiment of the present disclosure.

FIG. 5 is a graph 500 that illustrates signals of a vehicle propulsion system control system in accordance with another exemplary embodiment of the present disclosure. In addition to, or in the alternative to basing a determination about whether to open the torque converter clutch in response to an engine speed in relation to a threshold engine speed, the decision may be based upon the capability of the CVT system to provide a desired ratio rate. Graph 500 includes an accelerator pedal position 502, an engine speed 504, a turbine speed 506, a desired ratio rate 508, a pump limited ratio rate 510 and a torque converter clutch mode (state machine) 512. As the accelerator pedal position 502 indicates a request from a driver to increase output torque from the vehicle propulsion system, a desired ratio rate 508 may be determined. Initially, the CVT may be capable of causing the actual ratio to follow the desired ratio rate 508, however, current conditions may limit the ability of the CVT to continue to follow the desired ratio rate 508. In one exemplary embodiment, this limitation may be related to the conditions and/or configuration of the pump providing the hydraulic flow and pressure that is required to control the ratio of the CVT. This may be known and determined as a pump limited ratio rate 510. When the difference between the pump limited ratio rate 510 and the desired ratio rate 508 meets or exceeds a predetermined threshold 514, then the control system may cause the torque converter to open, as illustrated by torque converter clutch mode signal 512. In response, the engine speed 504 may then more quickly increase and diverge away from the turbine speed 506 which, in turn, enables the engine to more quickly reach a condition which provides a higher torque output, which then, in turn, may improve the ability of the pump provide the hydraulic flow and pressure which enables the ratio to more closely follow the desired ratio rate 508 as indicated by the change in the limited ratio rate 510 more closely following the desired ratio rate 508.

In an exemplary embodiment, the ability for the CVT pump to provide a ratio rate change may be limited based upon the mode in which the CVT pump operates. For example, some CVT pumps may operate in one of a reduced flow/pressure mode and a full flow/pressure mode. With this structure, an exemplary embodiment may determine whether the ratio rate is pump limited or not based upon whether the pump is operating in the reduced flow/pressure mode. If it is operating in a reduced flow/pressure mode, then the ability of the CVT to follow the desired ratio rate may be limited and an exemplary control system may open the torque converter clutch in response to a determination that the pump is not operating in a reduced flow/pressure mode. Other conditions and/or signals, without limitation, may also be used for determining what, if any, limitation may be placed upon the ratio rate without limitation and the operation of the torque converter clutch may then be calibrated accordingly.

Figure 6:
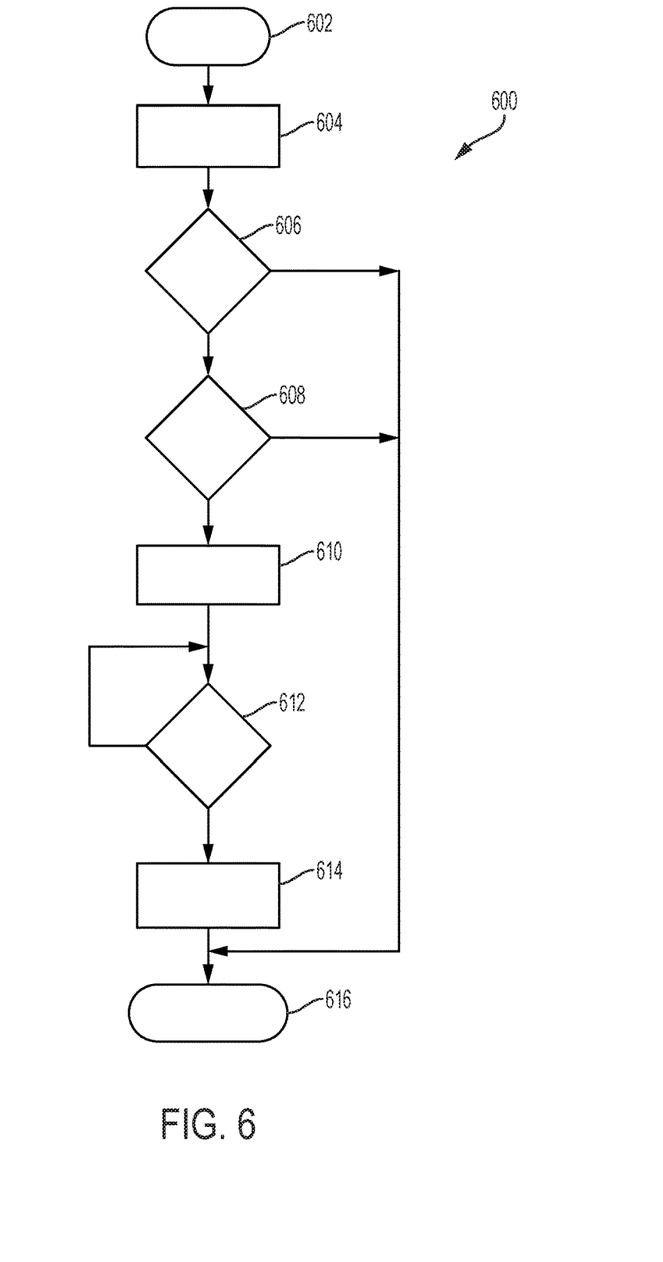
FIG. 6 is a flowchart of an exemplary method in accordance with the present disclosure.

FIG. 6 illustrates a flowchart 600 of an exemplary method in accordance with an exemplary embodiment of the present disclosure. The method starts at step 602 and continues to step 604. In step 604, the conditions of the vehicle propulsion system are sensed, calculated, determined and/or measured. These conditions may include, for example, the driver's accelerator pedal position, engine speed, the CVT ratio, the configuration of the CVT ratio control pump, the altitude, the engine capacity, and the like without limitation. The method then continues to step 606. In step 606, the method determines whether a step ratio reduction is requested. For example, a controller for a vehicle propulsion system may determine based upon the information gathered in step 604 whether a step reduction in CVT ratio is requested. If, in step 606, the method determines that a step ratio reduction in CVT ratio is requested, then the method continues to step 608. In step 608, the method determines whether the conditions indicate whether to open the torque converter clutch based upon the information gathered in step 604. If, in step 608, the method determines to open the torque converter clutch then the method continues to step 610 where the method opens the torque converter clutch.

The method then continues to step 612. In step 612, the method determines whether the ratio change has substantially completed. If, in step 612, the method determines that the ratio change has substantially completed, then the method applies the torque converter clutch. For example, the torque converter clutch may then be controlled to enter into a slip mode and to transition into a lock mode. The method then continues to step 616 where the method ends. If, in step 606, the method determines that a step ratio reduction is not requested or, if in step 608, the method determines that the conditions indicate that the torque converter clutch should not be opened, then the method continues to step 616 where the method ends.

This description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims.

What is claimed is:

1. A vehicle propulsion system, the system comprising:
   a prime mover having an output shaft;
   a torque converter including a compressor coupled to the output shaft of the prime mover, a turbine fluidly coupled to the compressor, and a torque converter clutch for selectively mechanically coupling the compressor to the turbine;
   a continuously variable transmission (CVT) coupled to the turbine of the torque converter; and
   a controller programmed to:
      receive signals indicating operating conditions of the vehicle propulsion system;
      determine whether the received signals indicate a reduction in ratio in the CVT is impending;
      determine whether to open the torque converter clutch based upon a determination that a reduction in ratio is impending; and
      open the torque converter clutch in response to a determination to open the torque converter clutch,
   wherein the received signals comprise a prime mover capacity signal that indicates the capacity of the prime mover to provide torque and wherein the determining whether to open the torque converter clutch is further based upon the prime mover capacity signal, wherein the controller is further programmed to determine whether the capacity of the prime mover to provide torque is below a predetermined threshold and wherein the determination whether to open the torque converter clutch is further based upon whether the capacity of the prime mover to provide torque is below the predetermined threshold and, wherein the received signals comprise a signal indicative of an altitude of the vehicle propulsion system and wherein the controller determines whether the capacity of the prime mover is below a predetermined threshold based upon a determination whether the altitude is above a predetermined altitude.

2. A method for controlling a vehicle propulsion system that includes a prime mover having an output shaft, a torque converter including a compressor coupled to the output shaft of the prime mover, a turbine fluidly coupled to the compressor, and a torque converter clutch for selectively mechanically coupling the compressor to the turbine, and a continuously variable transmission (CVT) coupled to the turbine of the torque converter, the method comprising:

receiving signals indicating operating conditions of the vehicle propulsion system;

determining whether the received signals indicate a reduction in ratio in the CVT is impending;

determining whether to open the torque converter clutch based upon a determination that a reduction in ratio is impending; and opening the torque converter clutch in response to a determination to open the torque converter clutch, wherein the received signals comprise a prime mover capacity signal that indicates the capacity of the prime mover to provide torque and wherein determining whether to open the torque converter clutch is further based upon the prime mover capacity signal, further comprising determining whether the capacity of the prime mover to provide torque is below a predetermined threshold and wherein the determining whether to open the torque converter clutch is further based upon whether the capacity of the prime mover to provide torque is below the predetermined threshold, wherein the received signals comprise a signal indicative of an altitude of the vehicle propulsion system and wherein determining whether the capacity of the prime mover is below a predetermined threshold is based upon a determination whether the altitude is above a predetermined altitude.

* * * * *